US006702066B1

(12) United States Patent
Eaton

(10) Patent No.: US 6,702,066 B1
(45) Date of Patent: Mar. 9, 2004

(54) LADDER LEVELING DEVICE

(76) Inventor: William Eaton, 248 21 88th Dr., Bellerose, NY (US) 11426

( * ) Notice: Subject to any disclaimer, the term of this patent is extended or adjusted under 35 U.S.C. 154(b) by 17 days.

(21) Appl. No.: 10/215,829

(22) Filed: Aug. 9, 2002

Related U.S. Application Data

(63) Continuation of application No. 09/877,504, filed on Jun. 11, 2001, now abandoned.

(51) Int. Cl.[7] ............................ E06C 1/00; F16M 11/24
(52) U.S. Cl. ..................... 182/204; 182/201; 248/188.2
(58) Field of Search ................................ 182/200–205; 248/188.2, 188.5

(56) References Cited

U.S. PATENT DOCUMENTS 2,127,884 A * 8/1938 Overpeck ................... 182/204
2,147,052 A * 2/1939 Noone ........................ 182/204
2,275,086 A * 3/1942 Moore ........................ 182/204
2,405,269 A * 8/1946 Prutsman .................... 182/204

* cited by examiner

*Primary Examiner*—Hugh B. Thompson
(74) *Attorney, Agent, or Firm*—Goldstein & Lavas, PC.

(57) ABSTRACT

A ladder leveling device including a gripping plate having an inner surface and an outer surface. The gripping plate has an elongated central slot therethrough that corresponding with a vertical slot extending through the bottom portion of each ladder leg. The central slot has a pair of threaded bolts adjustably disposed therein and extending outwardly therefrom. The outer surface has gripping teeth disposed thereon. The gripping plate has a plurality of apertures therethrough. The inner surface is positionable against the outside surface of the leg bottom portion with the apertures receiving screws therethrough to secure the gripping plate to the ladder. A leg extension is provided having a generally rectangular configuration, and inner and outer surfaces, the inner surface having gripping teeth disposed thereon. The leg extension has a pair of apertures therethrough in a spaced relationship. The leg extension is adjustably coupled with the gripping plate.

3 Claims, 2 Drawing Sheets

LADDER LEVELING DEVICE

CROSS REFERENCES AND RELATED SUBJECT MATTER

This application is a continuation of utility patent application Ser. No. 09/877,504, filed in the United States Patent Office on Jun. 11, 2001, now abandoned.

BACKGROUND OF THE INVENTION

The present invention relates to a ladder leveling device and more particularly pertains to attaching to legs of a ladder to allow a height of the legs to be individually adjusted to insure that the ladder is level on a recipient surface.

The use of adjustable ladders is known in the prior art. More specifically, adjustable ladders heretofore devised and utilized for the purpose of adjusting to accommodate certain situations are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe a ladder leveling device for attaching to legs of a ladder to allow a height of the legs to be individually adjusted to insure that the ladder is level on a recipient surface.

In this respect, the ladder leveling device according to the present invention substantially departs from the conventional concepts and designs of the prior art, and in doing so provides an apparatus primarily developed for the purpose of attaching to legs of a ladder to allow a height of the legs to be individually adjusted to insure that the ladder is level on a recipient surface.

Therefore, it can be appreciated that there exists a continuing need for a new and improved ladder leveling device which can be used for attaching to legs of a ladder to allow a height of the legs to be individually adjusted to insure that the ladder is level on a recipient surface. In this regard, the present invention substantially fulfills this need.

SUMMARY OF THE INVENTION

In the view of the foregoing disadvantages inherent in the known types of adjustable ladders now present in the prior art, the present invention provides an improved ladder leveling device. As such, the general purpose of the present invention, which will be described subsequently in greater detail, is to provide a new and improved ladder leveling device which has all the advantages of the prior art and none of the disadvantages.

To attain this, the present invention essentially comprises a gripping plate having an inner surface and an outer surface. The gripping plate has an elongated central slot therethrough that corresponds with a vertical slot extending through the bottom portion of each ladder leg. The central slot has a pair of threaded bolts adjustably disposed therein and extending outwardly therefrom. The outer surface has gripping teeth disposed thereon. The gripping plate has a plurality of apertures therethrough. The inner surface is positionable against the leg of the ladder with the apertures receiving screws therethrough to secure the gripping plate to the leg of the ladder. A leg extension is provided having a generally rectangular configuration. The leg extension has inner and outer surfaces. The inner surface has gripping teeth disposed thereon. The leg extension has a pair of apertures therethrough in a spaced relationship. The leg extension is adjustably coupled with the gripping plate with the gripping teeth thereof engaging the gripping teeth of the gripping plate with the pair of apertures receiving the threaded bolts therethrough and secured with wing nuts. The number gripping plates and leg extensions corresponds with a number of legs of the ladder.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ladder leveling device which has all the advantages of the prior art adjustable ladders and none of the disadvantages.

It is another object of the present invention to provide a new and improved ladder leveling device which may be easily and efficiently manufactured and marketed.

It is a further object of the present invention to provide a new and improved ladder leveling device which is of durable and reliable construction.

An even further object of the present invention is to provide a new and improved ladder leveling device which is susceptible of a low cost of manufacture with regard to both materials and labor, and which accordingly is then susceptible of low prices of sale to the consuming public, thereby making such a ladder leveling device economically available to the buying public.

Even still another object of the present invention is to provide a new and improved ladder leveling device for attaching to legs of a ladder to allow-a height of the legs to be individually adjusted to insure that the ladder is level on a recipient surface.

Lastly, it is an object of the present invention to provide a new and improved ladder leveling device including a gripping plate having an inner surface and an outer surface, The gripping plate has an elongated central slot therethrough. The central slot has a pair of threaded bolts adjustably disposed therein and extending outwardly therefrom. The outer surface has gripping teeth disposed thereon. The gripping plate has a plurality of apertures therethrough. The inner surface is positionable against the leg of the ladder with the apertures receiving screws therethrough to secure the gripping plate to the leg of the ladder. A leg extension is provided having a generally rectangular configuration. The leg extension has inner and outer surfaces. The inner surface has gripping teeth disposed thereon. The leg extension has a pair of apertures therethrough in a spaced relationship. The leg extension is adjustably coupled with the gripping plate with the gripping teeth thereof engaging the gripping teeth of the gripping plate with the pair of apertures receiving the threaded bolts therethrough and secured with wing nuts. The number gripping plates and leg extensions corresponds with a number of legs of the ladder.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the, following detailed description thereof. Such description makes reference to the annexed drawings wherein.

The same reference numerals refer to the same parts through the various figures.

DESCRIPTION OF THE PREFERRED EMBODIMENT

Figure 1:
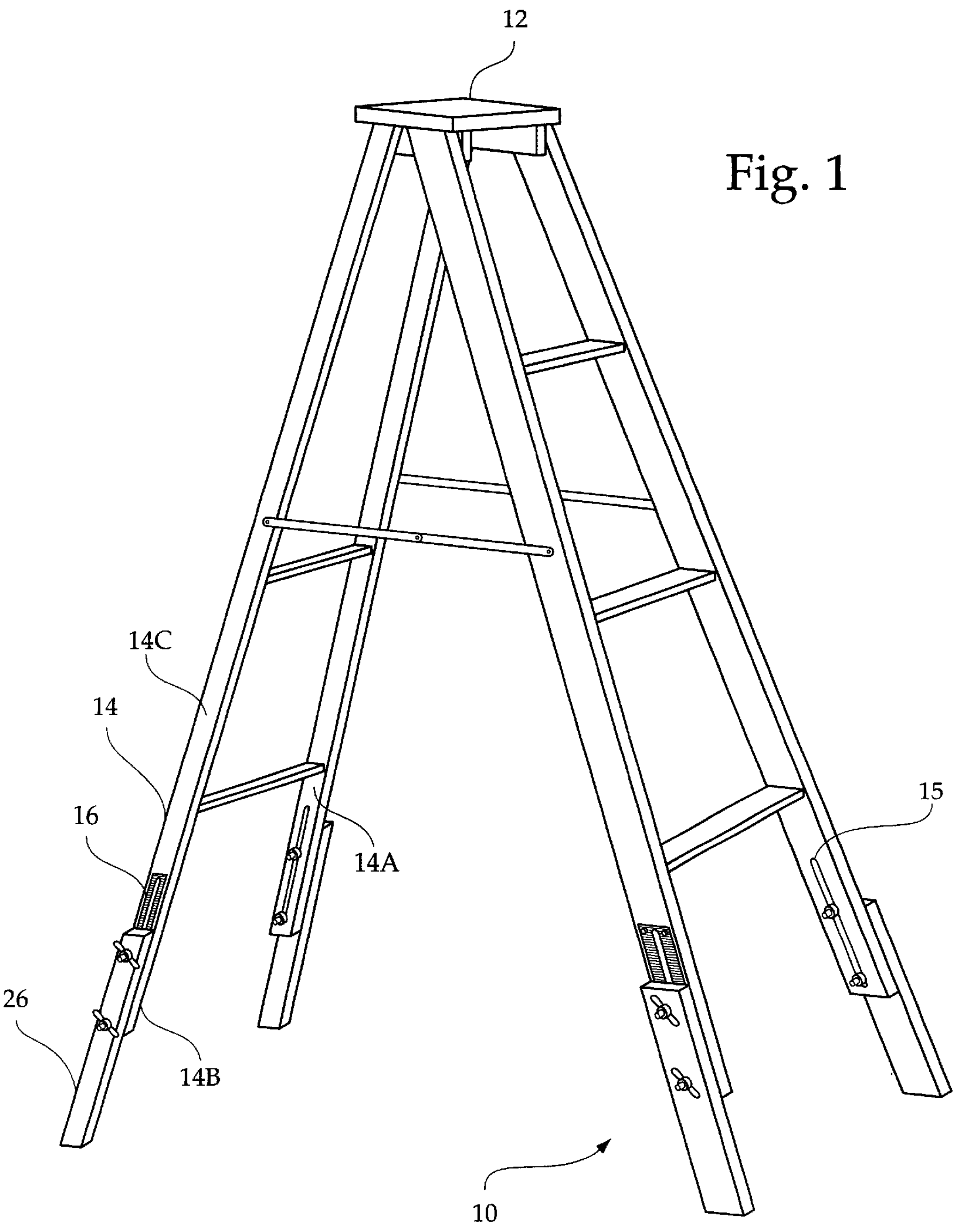
FIG. 1 is a perspective view of the preferred embodiment of the ladder leveling device constructed in accordance with the principles of the present invention.
Figure 2:
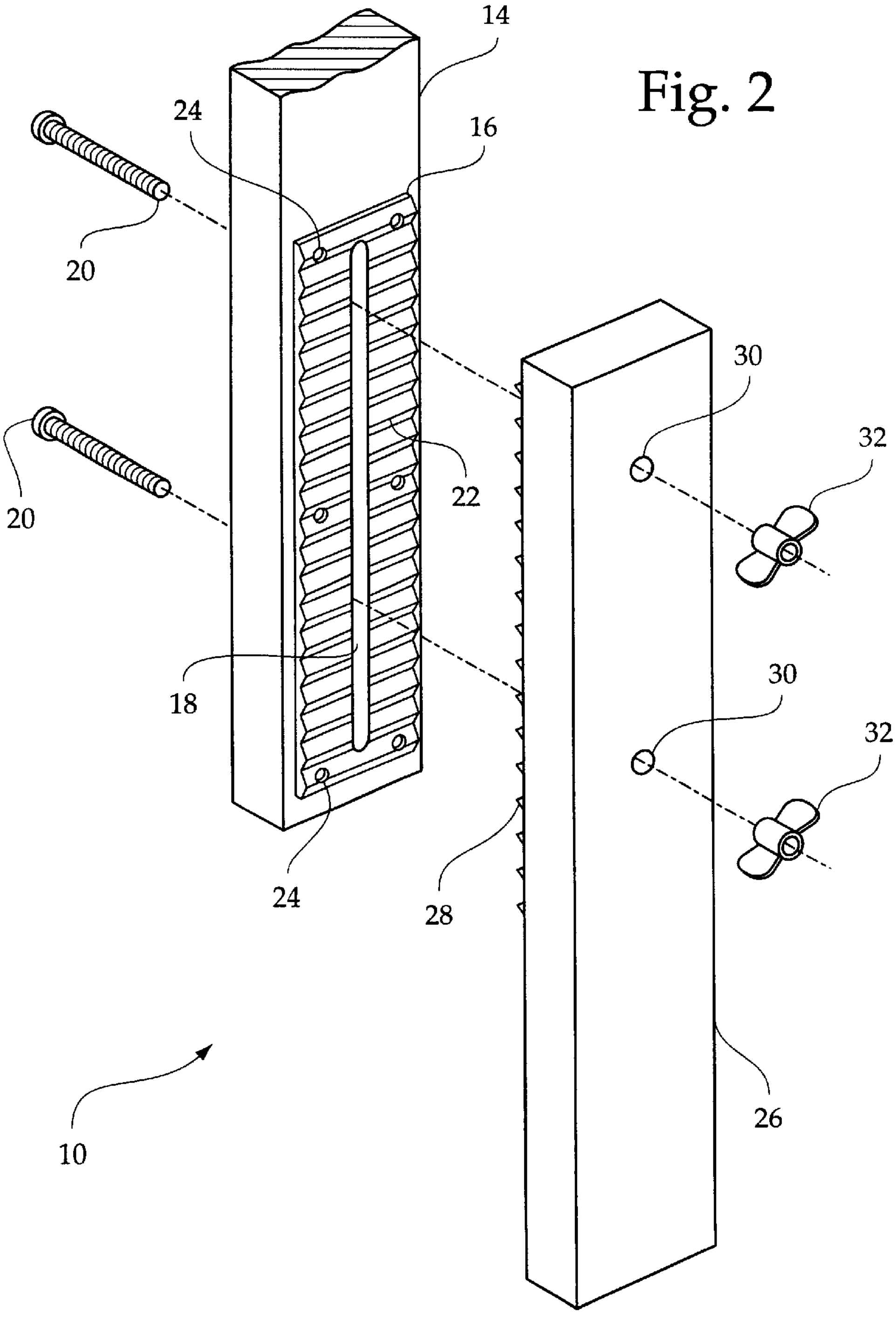
FIG. 2 is an exploded perspective view of the present invention.

With reference now to the drawings, and in particular, to FIGS. 1 and 2 thereof, the preferred embodiment of the new and improved ladder leveling device embodying the principles and concepts of the present invention and generally designated by the reference number 10 will be described.

Specifically, it will be noted in the various figures that the device relates to a ladder leveling device for attaching to legs of a ladder to allow a height of the legs to be individually adjusted to insure that the ladder is level on a recipient surface. In its broadest context, the device consists of a gripping plate and a leg extension. Such components are individually configured and correlated with respect to each other so as to attain the desired objective.

The present invention is designed for use on all types of ladders 12, such as extension ladders, step-ladders, etc., the ladder 12 having a plurality of rungs, the plurality of rungs having a lowest rung. The present invention will correspond with the number of legs 14 that the ladder 12 has. Each ladder leg 14 has a bottom portion 14B, an inside surface 14A, an outside surface 14C, and a vertical slot 15 extending through the leg bottom portion 14B, from the outside surface 14C to the inside surface 14A. The rungs are ositioned horizontaly between two of the ladder legs 14, and the lowest rung is situated above the ladder leg bottom portion 14B. The ladder leveling device 10 is selectively attachable to one of the ladder legs 14 at the bottom portion 14B of the leg outside surface 14C. FIG. 1 illustrates the use of the present invention on a ladder having four legs.

The gripping plate 16 has an inner surface and an outer surface. The gripping plate 16 has an elongated, longitudinal central slot 18 therethrough, said slot 18 corresponding with the vertical slot 15 extending through the bottom portion 14B of the ladder leg 14. The longitudinal central slot 18 has a pair of threaded bolts 20 adjustably disposed therein and extending outwardly therefrom. The outer surface has gripping teeth 22 disposed thereon. The gripping plate 16 has a plurality of apertures 24 therethrough. The inner surface is positionable against the outside surface 14C of the leg bottom portion 14B of the ladder 12 with the apertures 24 receiving screws therethrough to secure the gripping plate 16 to the bottom portion 14B of the leg 14 of the ladder 12. The gripping plate slot 18 and the ladder leg vertical slot 15 each extend no higher than the lowest rung of the ladder. Note FIG. 2.

The leg extension 26 has a generally rectangular configuration. The leg extension 26 has inner and outer surfaces. The inner surface has gripping teeth 28 disposed thereon. The leg extension 26 has a pair of-apertures 30 therethrough in a spaced relationship. The leg extension 26 is adjustably coupled with the gripping plate 16 with the gripping teeth 28 thereof engaging the gripping teeth 22 of the gripping plate 16 with the pair of apertures 30 receiving the threaded bolts 20 therethrough and secured with wing nuts 32. The wing nuts 32 can be loosened to allow the leg extension 26 to be adjusted with respect to the gripping plate. The number gripping plates 16 and leg extensions 26 corresponds with a number of legs 14 of the ladder 12.

The gripping teeth 28 of the leg extension and the gripping teeth 22 of the gripping plate 16 preferably are triangular in cross section, and form triangular shaped valleys therebetween. Accordingly, when the gripping plate 16 is pulled tightly against the leg extension, the gripping teeth 28 and 22 securely prevent the gripping plate 16 from sliding with respect to the leg extension.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A ladder and leveling device system, comprising:

a ladder, the ladder having at least two legs, each leg having a bottom portion, an outside surface, an inside surface, and a slot extending horizontally through the leg bottom portion from the outside surface to the inside surface, the ladder further having a plurality of horizontal rungs extending between the two legs, the plurality of rungs having a lowest rung positioned above the ladder bottom portion;

a gripping plate having an inner surface and an outer surface, the gripping plate having an elongated longitudinal central slot therethrough, the central slot having a pair of threaded bolts adjustably disposed therein and extending outwardly therefrom, the outer surface having gripping teeth disposed thereon, the inner surface attached against the outside surface of one of the legs of the ladder at the leg bottom portion, wherein the gripping plate central slot corresponds with the ladder slot and the ladder slot and the gripping plate central slot extend no higher than the lowest rung of the ladder;

a pair of wing nuts;

a leg extension having a generally rectangular configuration, the leg extension having inner and outer surfaces, the inner surface having gripping teeth disposed thereon, the leg extension having a pair of apertures therethrough in a spaced relationship, the leg extension being adjustably coupled with the gripping plate with the gripping teeth thereof engaging the gripping teeth of the gripping plate with the pair of apertures receiving the threaded bolts therethrough and secured with the wing nuts; and wherein each of the legs of the ladder has one of the gripping plates and has one of the leg extensions associated therewith for allowing the height of the ladder legs to be individually adjusted.

2. The ladder and leveling device system as recited in claim 1, wherein each of the gripping teeth are peaked with a triangular cross section, and adjacent teeth meet at a triangular valley such that the gripping teeth of the leg extension selectively fall into valleys between gripping teeth of the gripping plate to help prevent the gripping plate from sliding with respect to the leg extension once the screws are fastened.

3. The ladder and leveling device system as recited in claim 2, wherein the wing nuts are tightened against the outside surface of the respective ladder leg bottom portions.

* * * * *